United States Patent [19]
Shiraishi

[11] Patent Number: 5,828,378
[45] Date of Patent: Oct. 27, 1998

[54] THREE DIMENSIONAL GRAPHICS PROCESSING APPARATUS PROCESSING ORDINARY AND SPECIAL OBJECTS

[75] Inventor: Naoto Shiraishi, Toyonaka, Japan

[73] Assignee: Ricoh Company, Ltd., Tokyo, Japan

[21] Appl. No.: 657,810

[22] Filed: May 31, 1996

[30] Foreign Application Priority Data

Jun. 1, 1995 [JP] Japan .................................. 7-135423

[51] Int. Cl.⁶ .................................................. G06T 15/00
[52] U.S. Cl. ........................................................ 345/422
[58] Field of Search ................................. 345/419–422, 345/426, 427, 429, 432, 433–435, 441

[56] References Cited

U.S. PATENT DOCUMENTS

| | | | |
|---|---|---|---|
| 5,448,690 | 9/1995 | Shiraishi et al. | 345/433 |
| 5,455,900 | 10/1995 | Shiraishi et al. | 345/441 |
| 5,596,685 | 1/1997 | Ashton | 395/133 |

FOREIGN PATENT DOCUMENTS

| | | |
|---|---|---|
| 2-24785 | 1/1990 | Japan . |
| 4-195377 | 7/1992 | Japan . |

OTHER PUBLICATIONS

"Simple Shadow Producing Method Using The Z–Buffer Method", by Kazuya Shimizu et al. p. 2053 (1985).

*Primary Examiner*—Almis R. Jankus
*Attorney, Agent, or Firm*—Cooper & Dunham LLP

[57] ABSTRACT

A three-dimensional graphics processing apparatus according to the present invention is provided with a memory which stores objects including an ordinary object and a special object, each object composed of polygons. A coordinate conversion processing device places each object stored in the memory in a three-dimensional coordinate system, and converts the coordinates of the placed object into those of a screen coordinate system. A MIN/MAX buffer memory stores Z values of front polygons of the special object and Z values of rear polygons of the special object. A drawing processing device determines whether or not Z values of a polygon of the ordinary object are values between the Z values of the front polygons and the Z values of the rear polygons of the special object stored in the MIN/MAX buffer memory. The drawing processing device performs a predetermined special operation when it is determined that the Z values of the polygon of the ordinary object are values between the Z values of the front polygons and the Z values of the rear polygons of the special object.

5 Claims, 19 Drawing Sheets

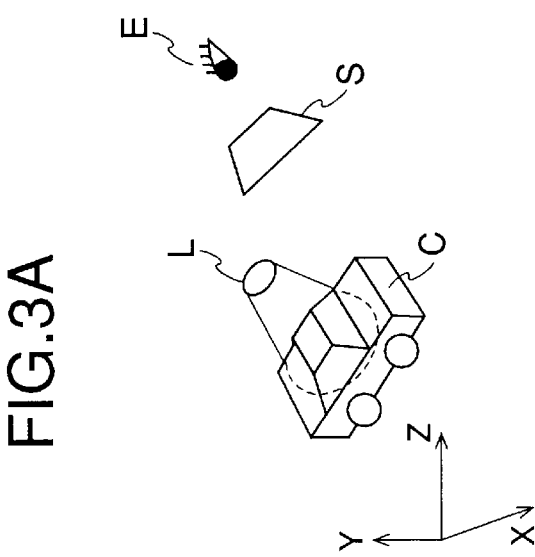
FIG.3A
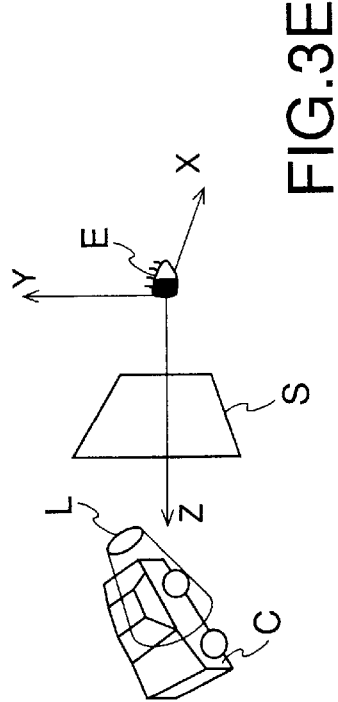
FIG.3B
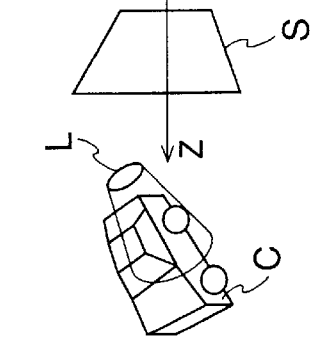
FIG.3C
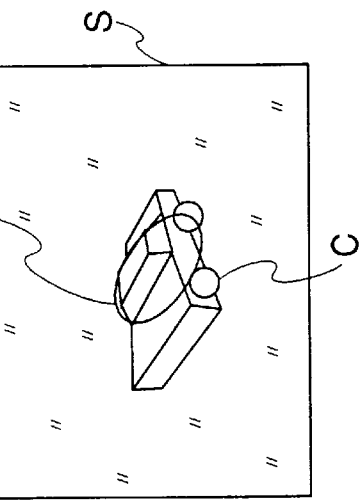
FIG.3E
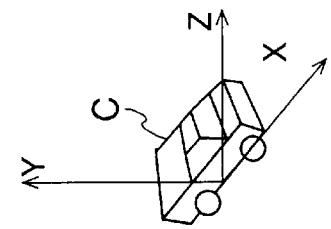
FIG.3D
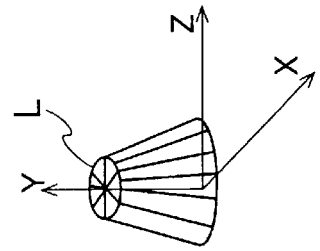

$\vec{LV}$ : RAY VECTOR $\vec{NV}$ : NORMAL VECTOR $\vec{EV}$ : VIEW VECTOR $\vec{RV}$ : REFLECTED RAY VECTOR

THREE DIMENSIONAL GRAPHICS
PROCESSING APPARATUS PROCESSING
ORDINARY AND SPECIAL OBJECTS

BACKGROUND OF THE INVENTION

1. Field of the Invention

The present invention relates to a three-dimensional graphics processing apparatus, and in particular to a three-dimensional graphics processing apparatus which performs lighting (spotlight processing), shadowing (shadow placement processing) and hit determination.

2. Description of the Related Art

By placing a shadow on an object displayed or, in other words, by performing shadowing, it is possible to provide computer graphics images with reality. As an algorithm for the shadowing, an Appel's scan-line method and a method using the Z-buffer method (see 'Simple Shadow Producing Method Using The Z-Buffer Method' by Kazuya Shimizu et al. in the Information Processing Society, the thirtieth (in the first term of 1985) national convention) are known.

Further, in the Japanese Laid-Open Patent Application No.4-195377, a shadow casting method using the Z-buffer method in a three-dimensional figure processing apparatus is proposed. In this method, a frame buffer (FRB) and a Z buffer are used for natural colors. Further, coordinate converting means is used for performing coordinate converting on each of the vertex coordinates of a source output object (origin of a shadow), light source coordinates, view-point coordinates and so forth. A cast shadow data producing means is used for producing cast shadow data which is generated as a result of light emitted by the light source being incident on each surface of the source output object and thereby a shadow being cast on a shadow casting surface. The cast shadow data producing means saves the cast shadow data together with light source information and source output object information. Means are used for calculating vertex luminance values of each object, which changes due to the light source given. Further, object clipping means is used. Drawing means outputs thus-produced object data to the frame buffer and Z buffer. Shadow producing means, when a drawing completion command is given, sorts the cast shadow data, produced by the cast shadow data producing means, in an order corresponding to how close to the light source the source output object is. Further, for an object which overlaps with a shadow region, the shadow producing means defines a shadow portion on the object and produces shadow figure coordinates. The shadow region is defined by the source output object surface and the cast shadow surface which were produced for each light source and also for each surface of the source output object. Further, the shadow producing means compares each of the vertex coordinates of the shadow figure and the Z value of the vertex stored in the Z buffer, and thus determines whether the shadow figure is visible and deletes an invisible portion. Thus, the size of the shadow figure is corrected. The shadow producing means calculates vertex luminance values of the shadow figure for each vertex of the shadow figure from the luminance value of the vertex read out from the frame buffer and the luminance value at the vertex due to the light source which produces the shadow. Finally, means draws the shadow figure which has been thus produced by the shadow producing means.

In the above-described shadowing method using the Z-buffer method, hidden surface processing is performed using the Z-buffer method with a light source used as a view point (first view point) for a certain directionally projected light, the result being stored in a light source Z buffer (extra Z buffer). Then, when hidden surface processing is performed using the Z-buffer method with an actual view point (second view point), the Z value of each dot is compared with the Z value for the dot stored in the light-source Z buffer. If the two Z values are equal to one another, a light-incident shading operation is performed on the dot. If the two Z values are different from one another, a shadow operation is performed on the dot.

In such a shadowing method using the Z-buffer method, shadowing can be performed only for a single directionally projected light. Further, for the shadowing method, double view-point operations and extra Z buffer (memory) are required. Thereby, the amount of calculation is increased and also the scale of the apparatus is enlarged.

When a three-dimensional graphics processing apparatus is used for a video game or the like, it is demanded that a position of a light source may not shift very much, and a shadow or the like which is beautiful but not real can be easily produced.

SUMMARY OF THE INVENTION

An object of the present invention is to solve the above-described problems, and to provide a three-dimensional graphics processing apparatus which can easily perform the shadowing (shadow placement processing). Further, the three-dimensional graphics processing apparatus can also easily perform lighting (spotlight processing) and hit determination through a similar way.

A three-dimensional graphics processing apparatus according to the present invention comprises:

first storing means for storing objects including an ordinary object and a special object, each object consisting of polygons;

coordinate conversion means for placing each object stored in the first storing means in a three-dimensional coordinate system, and converting coordinates of the thus-placed object into those of a screen coordinate system;

second storing means for storing Z values of front polygons of the special object and Z values of rear polygons of the special object;

determination means for determining whether or not Z values of a polygon of the ordinary object are values between the Z values of the front polygons and the Z values of the rear polygons of the special object stored in the second storing means; and performance means for performing a predetermined special operation when the determination means determines that the Z values of the polygon of the ordinary object are values between the Z values of the front polygons and the Z values of the rear polygons of the special object.

The special object may comprise any one of a shadow object, light object and hit object, and the predetermined special operation may comprise one of shadowing for performing a predetermined shadow luminance calculation, lighting for performing a predetermined light luminance calculation, and a hit occurrence determination for performing a predetermined hit occurrence operation.

According to the present invention, a shadow and a light are represented by a solid object consisting of polygons. Such a special object is not stored in the Z-buffer memory means but stored in the second storing means (MIN/MAX buffer memory) in a form of the Z values of the front polygons and the Z values of the rear polygons of the special object. When processing a polygon of the ordinary object, it is determined whether or not each dot of the polygon has a Z value between a Z value of the front polygons and a Z value of the rear polygons of the special object for the dot. Then, when the dot Z value is a value between the Z value of the front polygons and the Z value of the rear polygons of the special object, the predetermined special operation is performed for the object. Specifically, the shadowing, lighting (each through a predetermined luminance calculation) or hit occurrence determination is performed. Thus, such various operations can be performed in real time. Further, the various operations may be performed using common hardware.

Other objects and further features of the present invention will become more apparent from the following detailed description when read in conjunction with the accompanying drawings.

BRIEF DESCRIPTION OF THE DRAWINGS

FIGS. 2A, 2B, 3A, 3B, 3C, 3D and 3E illustrate a 'lighting' operation;

DETAILED DESCRIPTION OF THE PREFERRED EMBODIMENT

An embodiment of the present invention will now be described.

Figure 1:
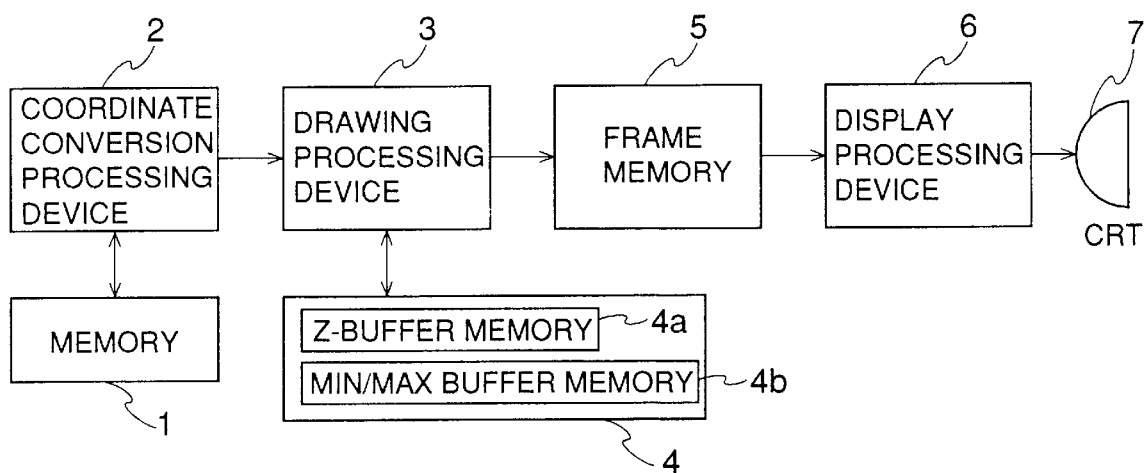
FIG. 1 shows a block diagram of a three-dimensional graphics processing apparatus in an embodiment of the present invention.

FIG. 1 shows a block diagram of a three-dimensional graphics processing apparatus in the embodiment of the present invention.

This three-dimensional graphics processing apparatus includes a memory 1, a coordinate conversion processing device 2, a drawing processing device 3, a buffer memory 4 which includes a Z-buffer memory 4a and a MIN/MAX buffer memory 4b, a frame memory 5, a display processing device 6 and a CRT 7 which displays an image thereon.

The above-mentioned coordinate conversion processing device 2, drawing processing device 3 and display processing device 6 can be embodied by general microcomputers with software programs which can be produced, for performing operations which will be described later, in accordance with a well-known programming method. The above-mentioned memory 1, buffer memory 4 and frame memory 5 can be embodied by general RAMs (Random Access Memories).

In the memory 1, information is stored which includes vertex points of polygons and normal vectors which are used for forming objects to be displayed. In this memory 1, not only the information for forming general objects but also the information for forming special objects is stored. The special objects are those which represent shadows, light or the like through solids of polygons. Each data for an object is given to the coordinate conversion processing device 2 from the memory 1.

The coordinate conversion processing device 2 is formed by a CPU (Central Processing Unit) or a DSP (Digital Signal Processor). The coordinate conversion processing device 2 performs rotation, magnification, size-reduction or the like of objects, arranges the objects in a world coordinate system, performs view-point conversion and screen projection, and thus converts the world coordinate system into a screen coordinate system.

Figure 2A:
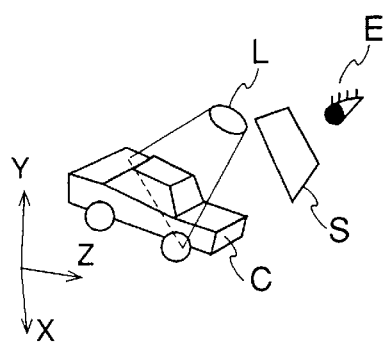
Figure 2B:
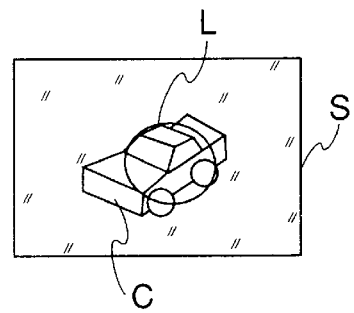

A case where the coordinate conversion processing device 2 performs lighting (spotlight processing) on an object C of a car shown in FIG. 2A for example will now be considered. The lighting (spotlight processing) is processing in which a spotlight, acting as a point light source, is used for spotlighting the car object C in the world coordinate system from a view point E via a screen S as shown in FIG. 2A and is converted into the screen coordinate system shown in FIG. 2B. With reference to FIGS. 3A, 3B, 3C, 3D and 3E, detailed description thereof will now be described. As shown in FIG. 3A, the car object C and a spotlight object L, formed by an approximately truncated circular cone which is formed by a polyhedron consisting of polygons, are arranged in the world coordinate system. In this example, the car object C shown in FIG. 3D and the spotlight object L shown in FIG. 3C are thus arranged in the world coordinate system as a result of being appropriately rotated. The spotlight object L has an attribute 'light' and is arranged so that, in the world coordinate system, the spotlight object L overlaps the car object C from an oblique top direction. After the arrangement is as shown in FIG. 3A in the world coordinate system, the view-point conversion is performed. The objects C and L are projected on the screen S, as shown in FIG. 3B, and the objects C and L are converted into the objects in the screen coordinate system as shown in FIG. 3E. Because the spotlight object L has the attribute 'light' and also overlaps the car object C as mentioned above, afterwards, a portion of the car object C inside the spotlight object L will be brightly drawn in the drawing processing device 3.

Figure 4A:
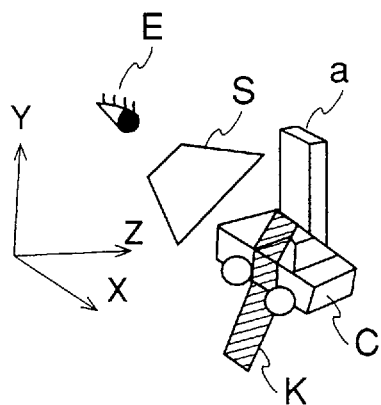
FIGS. 4A, 4B, 5A, 5B, 5C, 5D, 5E and 5F illustrate a 'shadowing' operation.
Figure 4B:
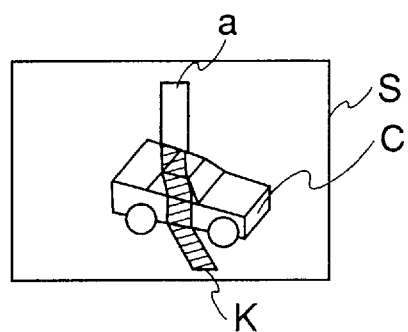
Figure 5F:
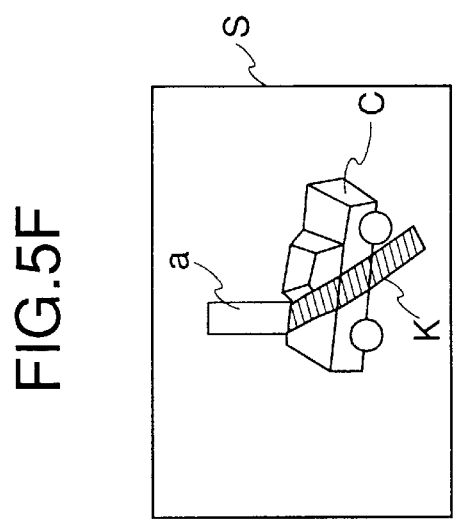
Figure 5B:
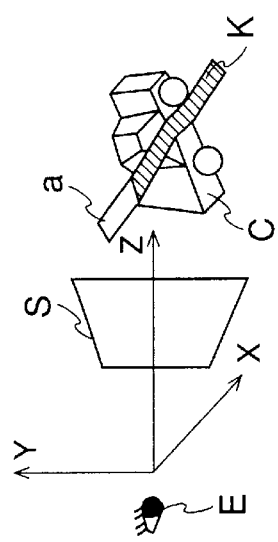
Figure 5E:
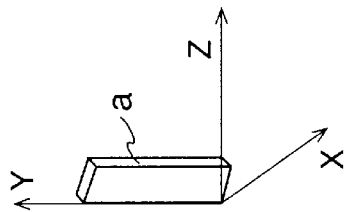
Figure 5D:
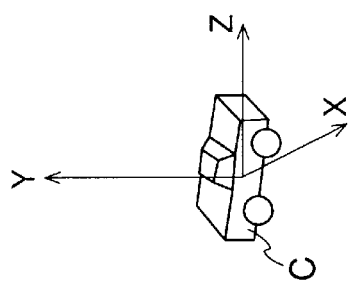
Figure 5A:
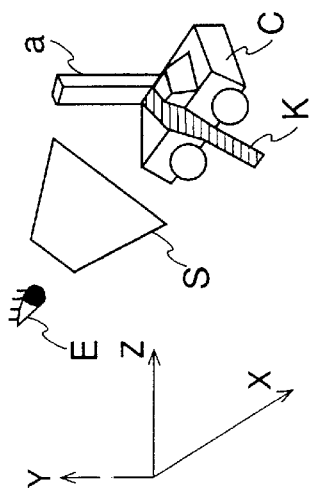
Figure 5C:
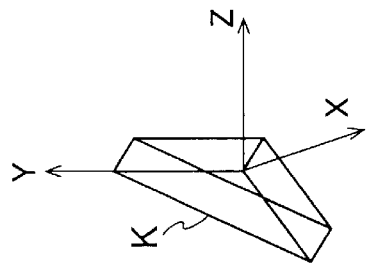

A case where the coordinate conversion processing device 2 performs shadowing (shadow placement processing) on an object C of a car shown in FIG. 4A will now be considered. The shadowing is processing in which a shadow of a rod object 'a' is placed on the car object C in the world coordinate system to be viewed from a view point E via the screen S as shown in FIG. 4A and is converted into the screen coordinate system shown in FIG. 4B. With reference to FIGS. 5A, 5B, 5C, 5D, 5E and 5F, detailed description thereof will now be described. As shown in FIG. 5A, the car object C, rod object 'a' and a shadow object K are arranged in the world coordinate system. In this example, the car object C shown in FIG. 5E, rod object 'a' shown in FIG. 5D and the shadow object K, actually formed by a thin triangle pole shown in FIG. 5C, are arranged in the world coordinate system as a result of being appropriately rotated. The shadow object K has an attribute 'shadow' and is arranged so that, in the world coordinate system, the shadow object K overlaps the car object C, in the middle thereof, as shown in FIG. 5A. After the arrangement is performed as shown in FIG. 5A in the world coordinate system, the view point conversion is performed, the objects C, 'a' and K are projected on the screen S, as shown in FIG. 5B, and the objects C, 'a' and K are converted into objects in the screen coordinate system as shown in FIG. 5F. Because the shadow object K has the attribute 'shadow' and also overlaps the car object C as mentioned above, a portion of the car object C located inside the shadow object K will be darkly drawn in the drawing processing device 3.

Figure 6A:
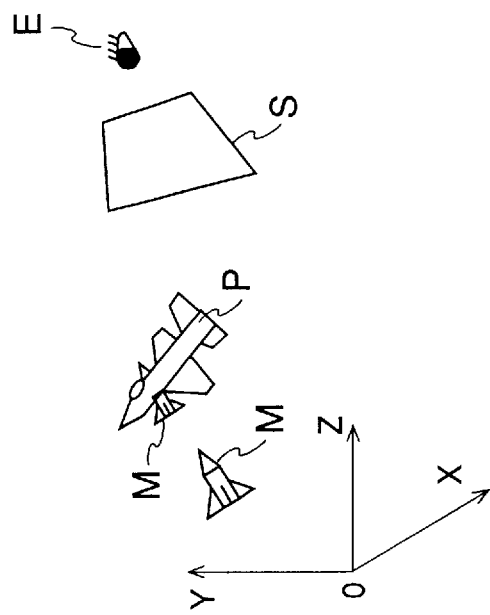
FIGS. 6A, 6B, 7A, 7B, 7C, 7D and 7E illustrate a 'hit determination' operation.
Figure 6B:
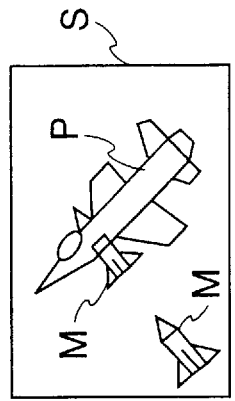
Figure 7A:
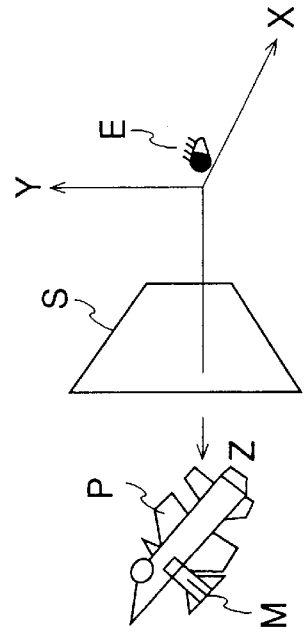
Figure 7B:
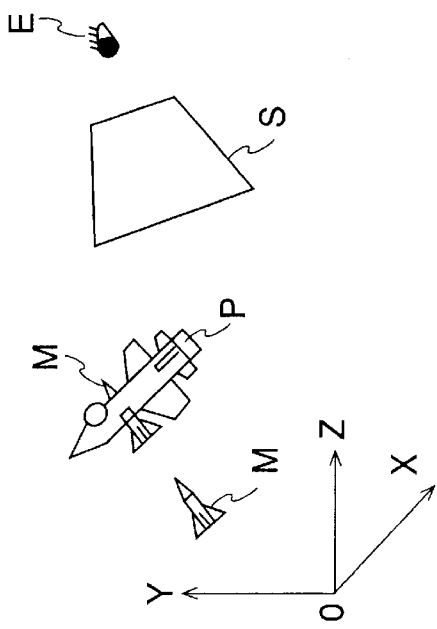
Figure 7C:
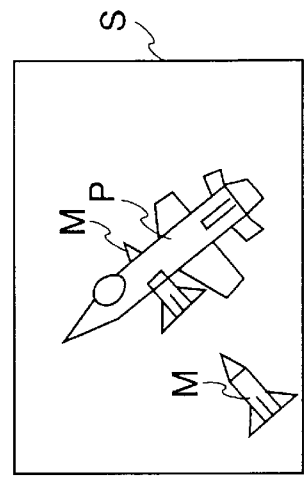
Figure 7D:
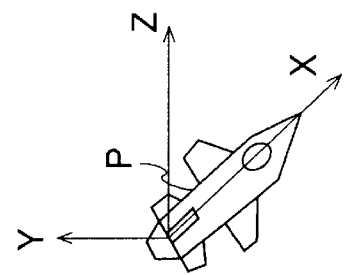
Figure 7E:
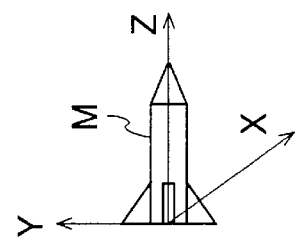

A case where the coordinate conversion processing device 2 performs hit determination on an airplane object P shown in FIG. 6A, for example, will now be considered. The hit determination is processing in which a missile object M pierces the airplane object P in the world coordinate system to be viewed from a view point E via the screen S as shown in FIG. 6A and is converted into the screen coordinate system shown in FIG. 6B. With reference to FIGS. 7A, 7B, 7C, 7D and 7E, a detailed description thereof will now be given. As shown in FIG. 7A, the airplane object P and the missile object M are arranged in the world coordinate system. In this example, the airplane object P shown in FIG. 7D and missile object M shown in FIG. 7C are arranged as a result of being appropriately rotated in the world coordinate system. The missile object M has a attribute 'hit' and is arranged so that, in the world coordinate system, the missile object M pierces the airplane object P, as shown in FIG. 7A. After the arrangement is performed as shown in FIG. 7A in the world coordinate system, the view point conversion is performed. The objects P and M are projected on the screen S, as shown in FIG. 7B, and the objects P and M are converted into objects in the screen coordinate system as shown in FIG. 7E. Because the missile object M has the attribute 'hit' and also pierces the airplane object P, occurrence of a 'hit' event is determined in the drawing processing device 3 and is transmitted to a CPU in the device 3.

Data of polygons which form objects that have been converted into objects in the screen coordinate system as a result of being projected on the screen S, are input to the drawing processing device 3 from the coordinate conversion processing device 2.

The drawing processing device 3 compares data of the polygons, converted into objects of the screen coordinate system in the processing device 2, with Z-buffer data stored in the Z-buffer memory 4a and MIN/MAX buffer memory 4b, and performs hidden surface processing. Further, using data stored in the MIN/MAX buffer memory 4b, the drawing processing device 3 performs the lighting (spotlight processing), shadowing (shadow placement processing) or hit determination. Then, the drawing processing device writes resulting data in the frame memory 5.

In the frame memory 5, color values (R, G, B) of each dot or corresponding LUT (Look-Up Table) addresses are stored.

The display processing device 6 accesses the frame memory 5, calculates a color of each dot from the stored color values or LUT addresses, and outputs the calculated color to the CRT 7 which then displays an image thereon using colors of dots.

Figure 8A:
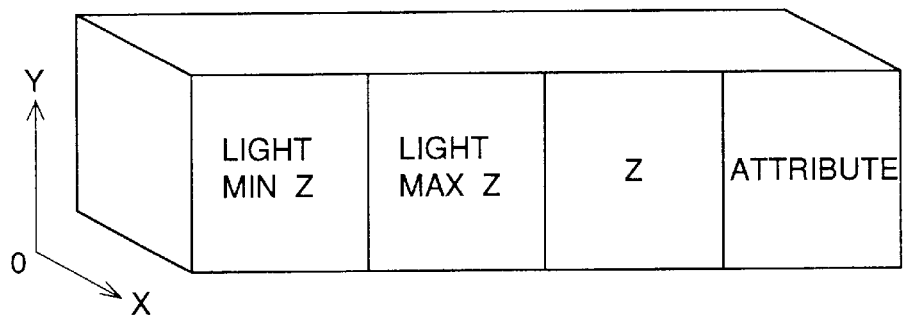
FIG. 8A shows a format of a Z-buffer memory and a MIN/MAX buffer memory when 'lighting' is performed.
Figure 8B:
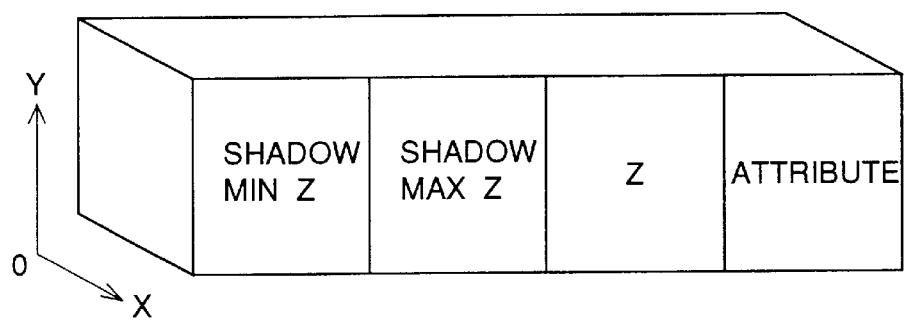
FIG. 8B shows a format of the Z-buffer memory and MIN/MAX buffer memory when 'shadowing' is performed.
Figure 8C:
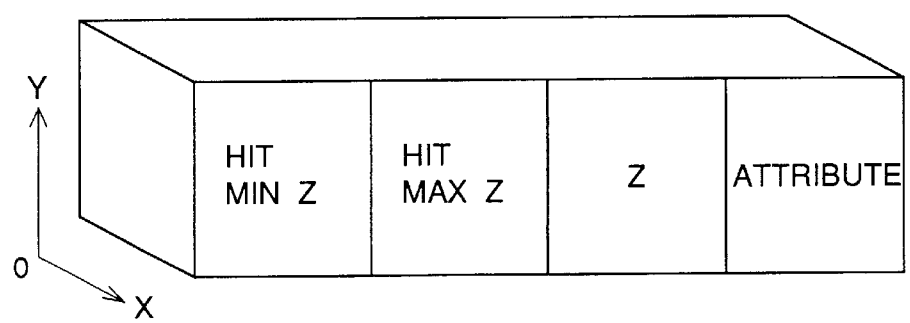
FIG. 8C shows a format of the Z-buffer memory and MIN/MAX buffer memory when 'hit determination' is performed.

As shown in FIGS. 8A, 8B and 8C, each of the Z-buffer memory 4a and MIN/MAX buffer memory 4b have different formats for the lighting, shadowing and hit determination. FIG. 8A shows a format used when the lighting is performed, FIG. 8B shows a format used when the shadowing is performed and FIG. 8C shows a format used when the hit determination is performed.

The format for the shadowing will be first described. As shown in FIG. 8B, when the shadowing is performed, a shadow minimum value SHADOW MIN Z and a shadow maximum value SHADOW MAX Z are stored in the MIN/MAX buffer memory 4b. The SHADOW MAX Z and SHADOW MIN Z will now be described using an example shown in FIG. 9. In the example shown in FIG. 9, in the screen coordinate system, a shadow C is placed on an object A which is a rectangular parallelepiped through a shadow object B. As shown in FIGS. 10A–10E, the shadow object B is a closed polyhedron and is a short triangle pole formed of five polygons in this embodiment. Such a shadow object defines a volume such that object part contained in the volume has a shadow placed thereon. The Z values on planes of two predetermined front polygons hatched in FIGS. 10D and 10E are referred to as SHADOW MIN Z, while the Z values on planes of predetermined three rear polygons hatched in FIGS. 10A, 10B and 10C are referred to as SHADOW MAX Z.

Figure 16:
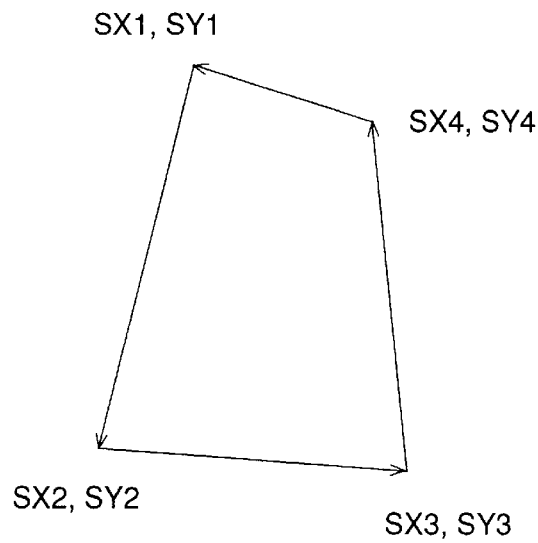
FIG. 16 shows polygon edge directions which may be applied in the present embodiment.

Each polygon has a direction of edges which is in the counterclockwise direction as shown in FIG. 16 in the present embodiment.

The above-mentioned Z values, SHADOW MIN Z and SHADOW MAX Z, represent the minimum Z value and the maximum Z value of a shadow object for each dot on the screen S, respectively. The MIN/MAX buffer memory 4b stores the SHADOW MIN Z and SHADOW MAX Z for each dot of the screen S.

Figure 9:
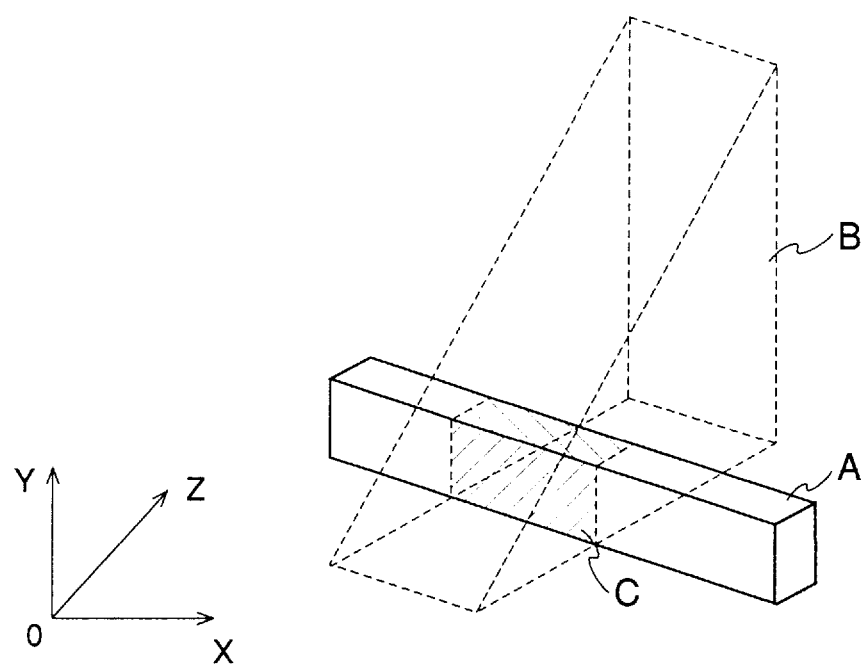
FIG. 9 shows an example of 'shadowing' performed on an ordinary object using a shadow object.
Figure 10A:
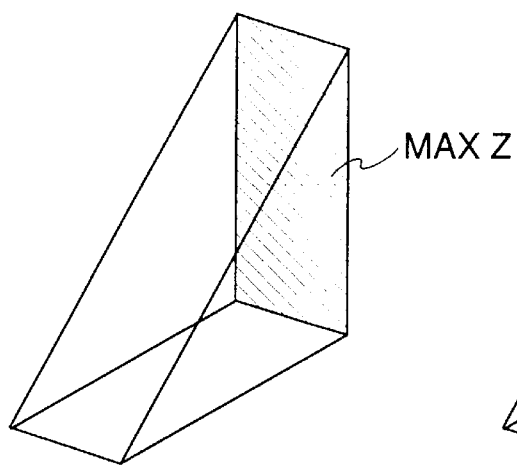
FIGS. 10A, 10B, 10C, 10D and 10E illustrate a spatial relationship of positions represented by SHADOW MIN Z and SHADOW MAX Z stored in the MIN/MAX buffer memory.
Figure 10B:
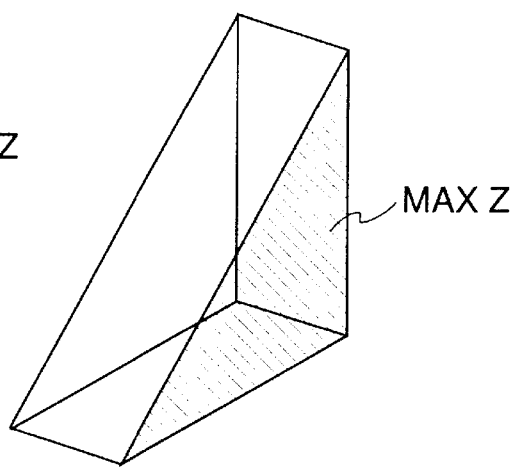
Figure 10C:
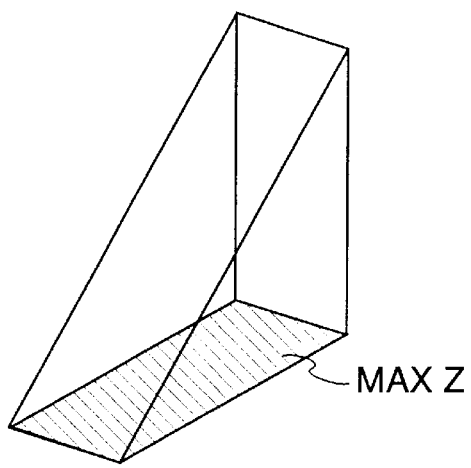
Figure 10D:
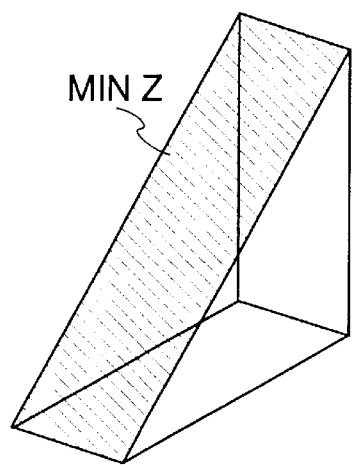
Figure 10E:
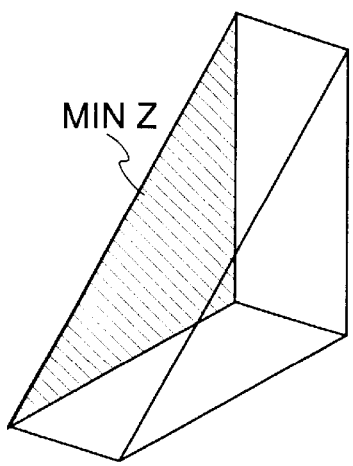

In the example shown in FIG. 9, the drawing processing device 3 compares the Z values of the object A with the Z values of the shadow object B, SHADOW MIN Z and SHADOW MAX Z, respectively. Then, the shadow C is placed on a part of the object A such that the Z values of the part are between the SHADOW MIN Z and SHADOW MAX Z of the shadow object B, that is, the Z values being such that SHADOW MIN Z≦Z≦SHADOW MAX Z.

The format for the lighting will now be described. In this case, in the MIN/MAX buffer memory 4b, instead of the SHADOW MIN Z and SHADOW MAX Z, LIGHT MIN Z and LIGHT MAX Z are stored as shown in FIG. 8A. The LIGHT MIN Z and LIGHT MAX Z represent the minimum Z value and the maximum Z value of a light object for each dot on the screen S, respectively. The MIN/MAX buffer memory 4b stores the LIGHT MIN Z and LIGHT MAX Z for each dot of the screen S. It is possible to read the shadow object B shown in FIG. 9 as the light object and accordingly to read the shadow C in the figure as a lighted region. In this example, the drawing processing device 3 compares the Z values of the object A with the Z values of the light object B, LIGHT MIN Z and LIGHT MAX Z, respectively. Then, the lighted region C is placed on a part of the object such that the Z values of the part are between the LIGHT MIN Z and LIGHT MAX Z of the shadow object B, that is, the Z values Z being such that LIGHT MIN Z≦Z≦LIGHT MAX Z.

Thus, in the case of shadowing, the region C shown in FIG. 9 is darkly drawn, while, in the case of lighting, the same region C is brightly drawn. However, the operation of determining the region C is common between the case of shadowing and the case of lighting.

A shape of each of the shadow object and light object is not limited to the shape shown in FIGS. 9–10E. Any shape forming a closed volume, such as the approximately truncated circular cone shown in FIG. 3C, can be used for this purpose. When a shape of the shading or light object is determined, front polygons thereof, the Z values on which are SHADOW or LIGHT MIN Z thereof, and rear polygons thereof, the Z values on which are SHADOW or LIGHT MAX Z thereof, will be determined. In a predetermined direction other than the Z direction, polygons of the object facing more forward are the front polygons, while polygons of the object facing more backward are the rear polygons.

Figure 11:
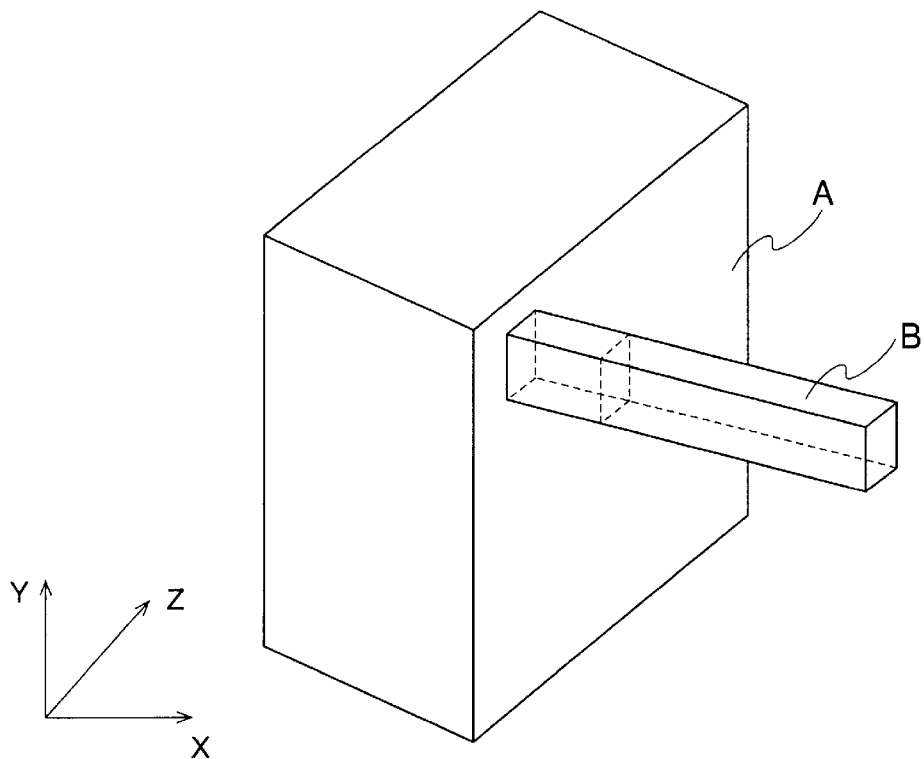
FIG. 11 shows an example of 'hit' between an ordinary object and a hit object.
Figure 12A:
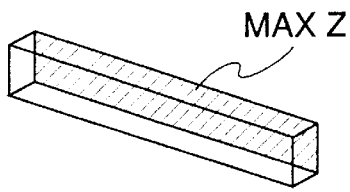
FIGS. 12A, 12B, 12C, 12D, 12E and 12F illustrate a spatial relationship of positions represented by HIT MIN Z and HIT MAX Z stored in the MIN/MAX buffer memory.
Figure 12B:
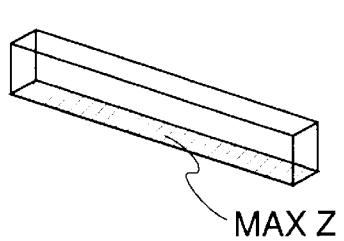
Figure 12C:
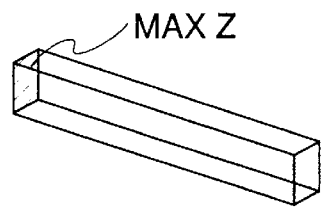
Figure 12D:
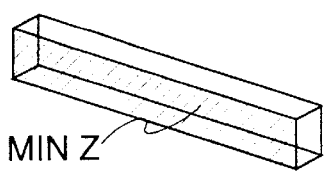
Figure 12E:
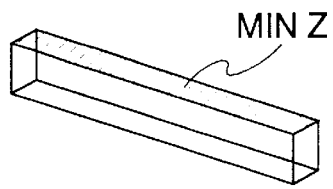
Figure 12F:
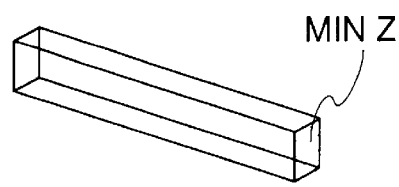
Figure 13:
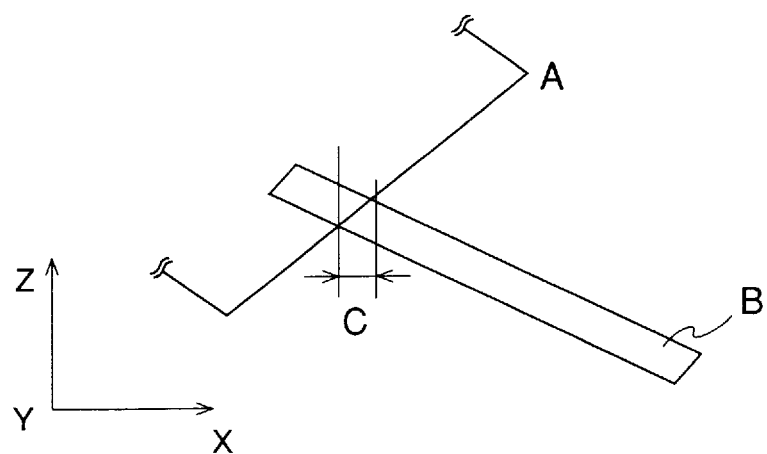
FIG. 13 also shows an example of 'hit' between the ordinary object and hit object.

The format for the hit determination will now be described. In this case, in the MIN/MAX buffer memory 4b, instead of the SHADOW MIN Z and SHADOW MAX Z, HIT MIN Z and HIT MAX Z are stored as shown in FIG. 8C. With reference to an example shown in FIG. 11, the HIT MIN Z and the HIT MAX Z will now be described. FIG. 11 shows a view in the screen coordinate system in which a hit determination is performed. In the example, an object B (referred to as a hit object B, hereinafter) collides with an object A. The hit object B consists of six polygons. The Z values on planes of the front polygons are referred to as HIT MIN Z as shown in FIGS. 12A, 12B and 12C, and the Z values on planes of the rear polygons are referred to as HIT MAX Z as shown in FIGS. 12D, 12E and 12F. The HIT MIN Z and HIT MAX Z represent the minimum Z value and the maximum Z value of the hit object B for each dot on the screen S, respectively. The MIN/MAX buffer memory 4b stores the HIT MIN Z and HIT MAX Z for each dot of the screen S. In the example shown in FIG. 11, the drawing processing device 3 compares the Z values of the object A with the Z values of the hit object B, HIT MIN Z and HIT MAX Z, respectively. The Z values of a part of the object A are between the HIT MIN Z and HIT MAX Z of the hit object B, that is, the Z values Z of the part of the object A are such that HIT MIN Z≦Z≦HIT MAX Z. For example, with reference to FIG. 13, the Z values of a part C of the object A are between the HIT MIN Z and HIT MAX Z of the hit object B. When the drawing processing device 3 finds such a part for the first time, the drawing processing device 3 sends this information to the CPU of the drawing processing device 3.

Figure 14:
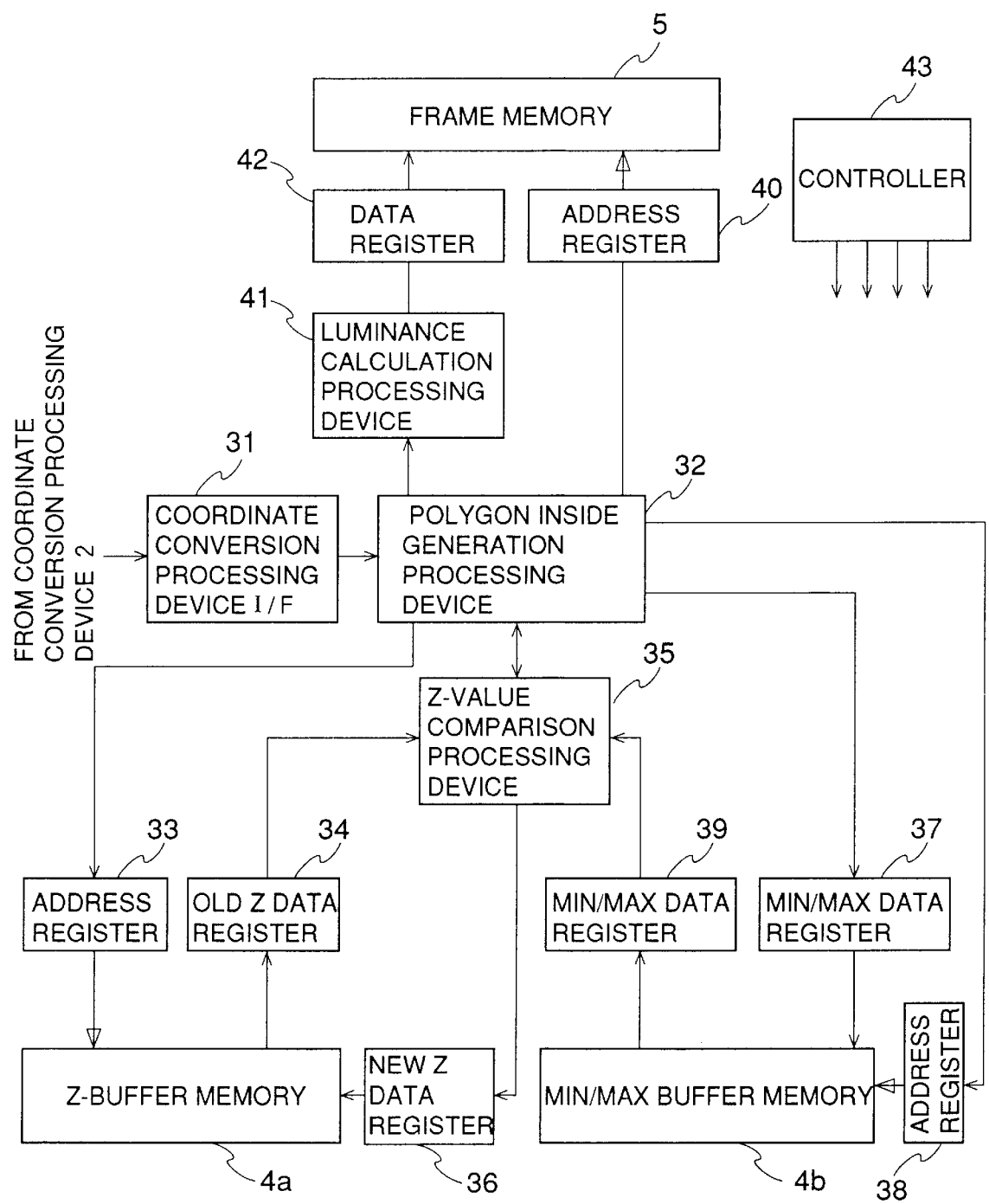
FIG. 14 shows a block diagram of a drawing processing device of the three-dimensional graphics processing apparatus shown in FIG. 1.

With reference to FIG. 14, an arrangement of the drawing processing device 3 will now be described.

The polygon vertex data, which has been converted into that of the screen coordinate system in the coordinate conversion processing device 2, is input to a coordinate conversion processing device interface (I/F) 31, and is then transferred to a polygon inside generation processing device 32.

The polygon inside generation processing device 32 determines or calculates Z values, colors, Z-buffer memory 4a addresses, frame memory 5 addresses of dots inside each polygon, from the polygon vertex data received from the interface 31. When the polygon is a polygon of either a shadow object, a light object or a hit object such as described above, values of respective ones of SHADOW MIN Z, SHADOW MAX Z; LIGHT MIN Z, LIGHT MAX Z; and HIT MIN Z, HIT MAX Z are determined as described above, and also MIN/MAX buffer addresses of the MIN/MAX buffer memory 4b for storing the values are also determined.

In this embodiment, the buffer memory 4 consists of the Z-buffer memory 4a and MIN/MAX buffer memory 4b. The Z-buffer memory 4a addresses calculated by the polygon inside generation processing device 32 are input to an address register 33, and used for accessing the Z-buffer memory 4a. The Z-buffer memory 4a stores therein the Z value of each pixel present in the screen. The Z values are output from the Z-buffer memory 4a and then stored in an old Z data register 34.

The Z values stored in the old Z data register 34 are input to a Z-value comparison processing device 35 which then compares the input Z values with the Z values input from the polygon inside generation processing device 32. When a Z value of the Z-buffer memory 4a is larger than Z value input from the polygon inside generation processing device 32, the Z value of the Z-buffer memory 4a is replaced with the Z value input from the polygon inside generation processing device 32, via a new Z data register 36, and thus the Z value of the Z-buffer memory 4a is updated.

However, when the dot is a dot of any of the shadow object, light object and hit object such as described above, in a different way from that above, the polygon inside generation processing device 32 calculates the values of respective ones of SHADOW MIN Z, SHADOW MAX Z; LIGHT MIN Z, LIGHT MAX Z; and HIT MIN Z, HIT MAX Z of the dot, and also calculates the MIN/MAX buffer memory 4b address for the dot. The thus calculated Z values are stored in the MIN/MAX buffer memory 4b at the address via a MIN/MAX data register 37. The thus-calculated address is input to another address register 38, and is used for accessing the MIN/MAX buffer memory 4b.

When a dot of an ordinary object is processed by the polygon inside generation processing device 32 and the dot has an XY address the same as the XY address of any of the lighting object, shadowing object and hit object, the values of the respective ones of SHADOW MIN Z, SHADOW MAX Z; LIGHT MIN Z, LIGHT MAX Z; and HIT MIN Z, HIT MAX Z are accessed, read out from the MIN/MAX buffer memory 4b, and are stored in another MIN/MAX data register 39. Then, the thus-stored Z values are read out and input to the Z-value comparison processing device 35 which compares the thus-input MIN/MAX Z values with the Z value of the dot input from the polygon inside generation processing device 32. When the Z value from the polygon inside generation processing device, 32 is a value between the respective one of the SHADOW MIN Z, SHADOW MAX Z; LIGHT MIN Z, LIGHT MAX Z; and HIT MIN Z, HIT MAX Z, that is, MIN Z≦Z≦MAX Z, the following processing is performed: In a case where the dot is a dot of either a shadow object or a light object, a color value of a special luminance value of the dot is calculated by a luminance calculation processing device 41; and in a case where the dot is a dot of a hit object, occurrence of a 'hit' event is provided to the CPU, that is, a controller 43 shown in FIG. 14.

The special luminance value and color which are calculated in the luminance calculation processing device 41 as mentioned above are stored in a data register 42. The frame memory 5 address of the dot calculated by the polygon inside generation processing device 32 is stored in an address register 40, and is used for storing data of the special luminance value and color which have been read out from the data register 42. Actually, the frame memory 5 stores the color value and/or a luminance value, or the corresponding LUT address for each pixel present in the screen.

The luminance calculation processing device 41 receives a luminance value and/or a color value, or the corresponding LUT address from the polygon inside processing device 32, and calculates a luminance and/or a color of each dot, and also calculates special luminance and/or color when the dot has been determined to undergo either lighting or shadowing.

The above-described devices provided in the drawing processing device 3 are controlled by the controller 43 which controls the devices according to flowcharts shown in FIGS. 17–22.

Figure 15:
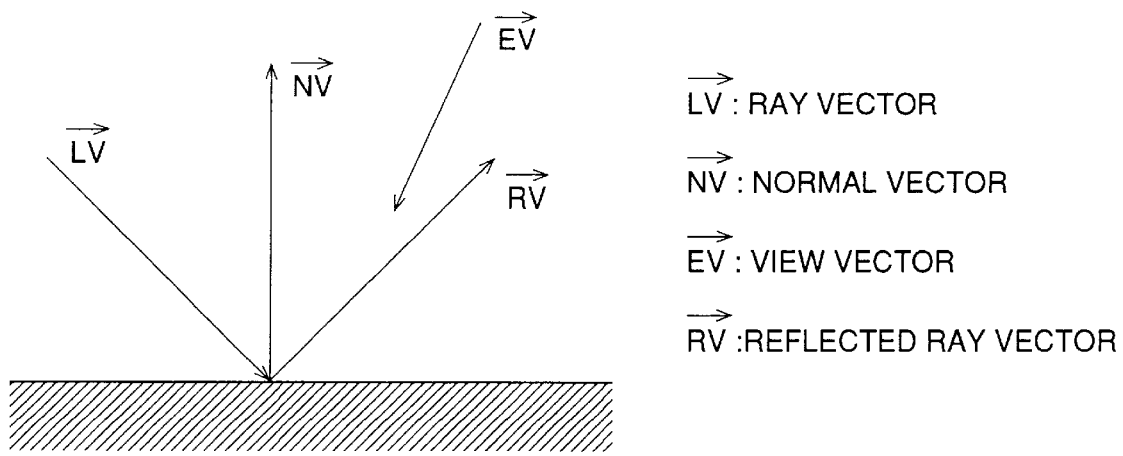
FIG. 15 shows the Phong shading model which may be used by the drawing processing device shown in FIG. 14.

FIG. 15 shows the Phong shading model (With regard to the Phong shading model, see B. Phong, Illumination for Computer Generated Images, Commun. of ACM, June 1975.). According to the model, color values R (Red), G (Green) and B (Blue) are calculated by the following equations (1), (2) and (3):

$$R = ((\vec{NV}.\vec{LV}).RK1 + (\vec{RV}.\vec{EV})^n.RK2).RL1 + RK3\ldots; \quad (1)$$

$$G = ((\vec{NV}.\vec{LV}).GK1 + (\vec{RV}.\vec{EV})^n.GK2).GL1 + GK3\ldots; \quad (2)$$

and $$B = ((\vec{NV}.\vec{LV}).BK1 + (\vec{RV}.\vec{EV})^n.BK2).BL1 + BK3\ldots; \quad (3)$$

where:
RK1: R diffuse reflection factor;
GK1: G diffuse reflection factor;
BK1: B diffuse reflection factor;
RK2: R specular reflection factor;
GK2: G specular reflection factor;
BK2: B specular reflection factor;
RK3: R ambient light level;
GK3: G ambient light level;
BK3: B ambient light level;
RL1: R light intensity;
GL1: G light intensity; and
BL1: B light intensity.

By using the principle of the Phong model for example, the luminance calculation processing device 41 calculates special luminance and/or color values R, G and B for a dot when the dot undergoes 'lighting'.

The following equations (4), (5) and (6) show a simple example of the lighting calculation which the luminance calculation processing device 41 can use for performing 'lighting' and determining special luminance and/or color values R, G and B for a dot:

$$R = PR \cdot (1-IL) + PMAXR \cdot (IL) \quad (4);$$

$$G = PG \cdot (1-IL) + PMAXG \cdot (IL) \quad (5);$$

and $$B = PB \cdot (1-IL) + PMAXB \cdot (IL) \quad (6);$$

where:
PR represents a predetermined polygon R level, PMAXR represents a predetermined polygon R maximum level;
PG represents a predetermined polygon G level, PMAXG represents a predetermined polygon G maximum level;
PB represents a predetermined polygon B level, PMAXB represents a predetermined polygon B maximum level; and
IL represents a predetermined luminance level.

The following equations (7), (8) and (9) show a simple example of the shadowing calculation which the luminance calculation processing device 41 can use for performing 'shadowing' and determining special luminance and/or color values R, G and B for a dot:

$$R = PR \cdot (1-SL) + SHADOWR \cdot (SL) \quad (7);$$

$$G = PG \cdot (1-SL) + SHADOWG \cdot (SL) \quad (8);$$

and $$B = PB \cdot (1-SL) + SHADOWB \cdot (SL) \quad (9);$$

where:
PR represents a predetermined polygon R level, SHADOWR represents a predetermined shadow R level;
PG represents a predetermined polygon G level, SHADOWG represents a predetermined shadow G level;
PB represents a predetermined polygon B level, SHADOWB represents a predetermined shadow B level; and
SL represents a predetermined shadow level.

Figure 17:
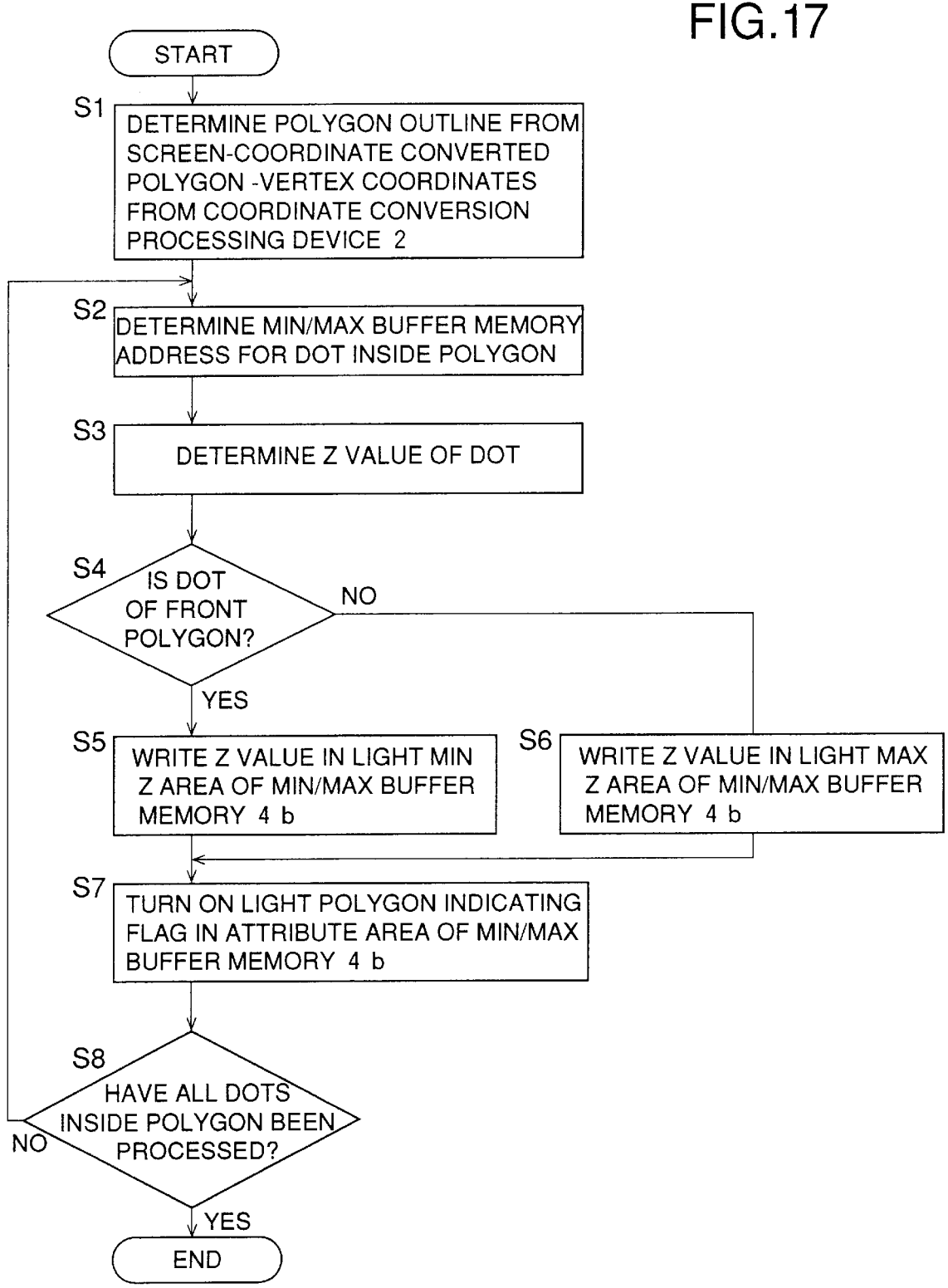
FIG. 17 shows an operation flowchart performed by the drawing processing device shown in FIG. 14 in a case where 'lighting' is performed and a polygon being processed is a light polygon.
Figure 18:
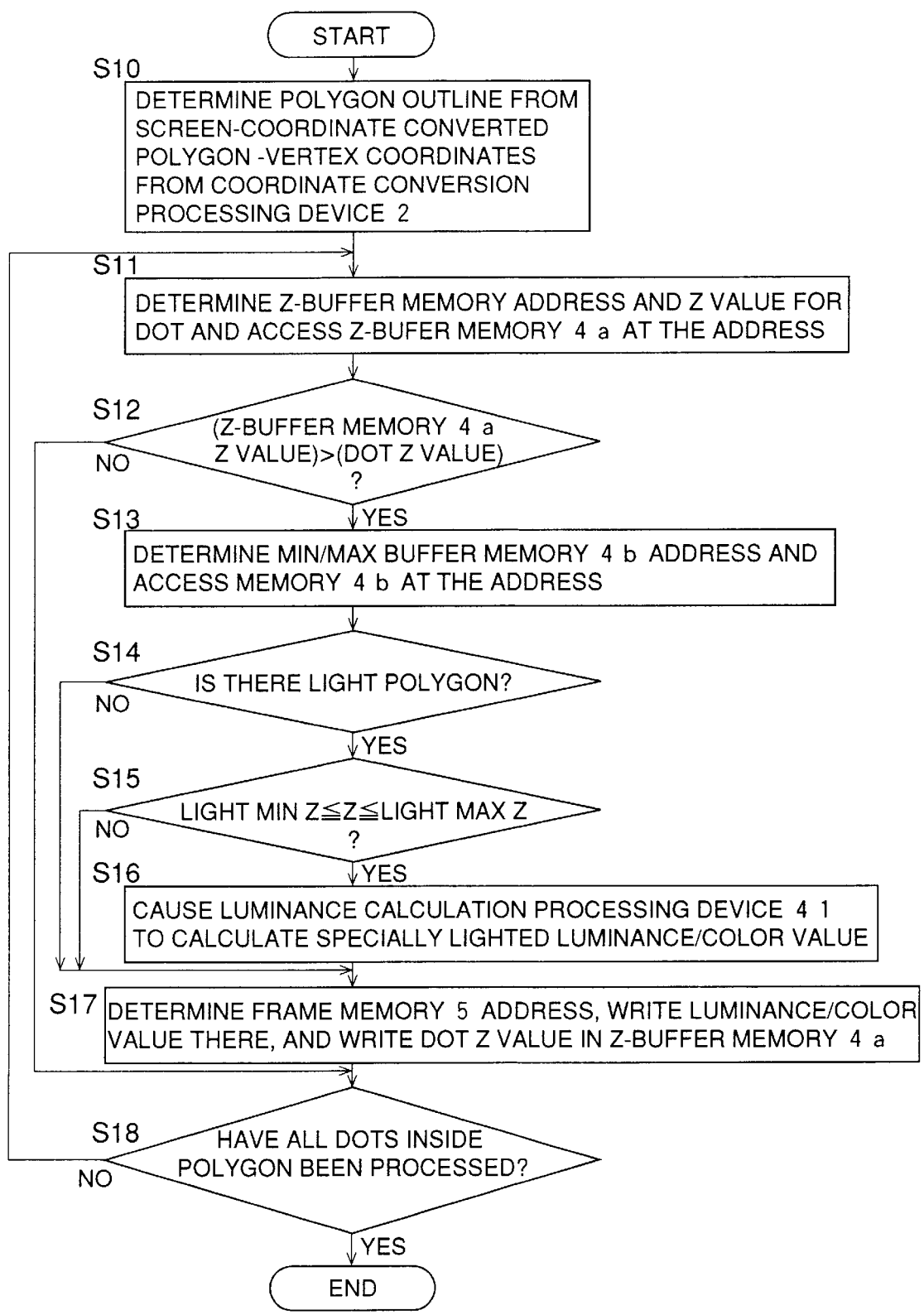
FIG. 18 shows an operation flowchart performed by the drawing processing device in a case where 'lighting' is performed and a polygon being processed is an ordinary polygon.

With reference to FIGS. 17–22, operations of the drawing processing device 3 will now be described. FIGS. 17 and 18 show operation flowcharts when 'lighting' is performed. FIG. 17 illustrates an operation when a polygon being processed is a polygon of a 'light object' (such a polygon being referred to as a light polygon, hereinafter) and FIG. 18 illustrates an operation when a polygon being processed is a polygon of an ordinary polygon (other than the light polygon).

With reference to FIG. 17, the operation of light polygon processing will now be described.

An outline of a light polygon is determined in a step S1 (the term 'step' being omitted, hereinafter) by using coordinates of polygon vertices, which coordinates have been obtained as a result of coordinate conversion into the screen coordinate system in the coordinate conversion processing device 2. Then, in S2, an address of the MIN/MAX buffer memory 4b is calculated for each dot present in the polygon. In S3, the Z value of the dot is determined.

Then, in S4, it is determined whether the polygon is a front polygon or a rear polygon of the light object such as that mentioned above. When the polygon is a front polygon, the Z value is written in the LIGHT MIN Z area at the address of the MIN/MAX buffer memory 4b in S5. When the polygon is a rear polygon, the Z value is written in the LIGHT MAX Z area at the address of the MIN/MAX buffer memory 4b in S6.

Further, in S7, a flag for indicating a presence of the light polygon in the attribute area at the address of the MIN/MAX buffer memory 4b is turned ON. Then, in S8, it is determined whether or not all the dots present in the polygon have been processed. If all the dots have not been processed, the operation returns to S2, and the above-described operation is repeated for processing the remaining dots until all the dots of the polygons have been processed. When all the dots have been processed, the current operation is terminated.

With reference to FIG. 18, the operation of ordinary polygon processing will now be described.

An outline of a light polygon is determined in a step S10 by using coordinates of polygon vertices, which coordinates have been obtained as a result of coordinate conversion into the screen coordinate system in the coordinate conversion processing device 2. Then, in S11, an address of the Z-buffer memory 4a is calculated for each dot present in the polygon, the Z value of the dot is determined, and the Z-buffer memory 4a is accessed at the address.

Then, in S12, the Z value of the Z-buffer memory 4a at the address is compared with the Z value of the dot determined in S11, and it is determined which Z value is larger. When the Z value in the Z-buffer memory 4a is larger, the address of the MIN/MAX buffer memory 4b for the dot is determined and the MIN/MAX buffer memory 4b is accessed at the address, in S13. Then, in S14, it is determined whether or not the flag of the attribute area at the address of the MIN/MAX buffer memory 4b is in an ON state, and thus there is a light polygon including the address. When there is a light polygon including the address, it is determined in S15 whether MIN Z≦Z≦MAX Z, that is, the Z value of the dot is a value between the LIGHT MIN Z and LIGHT MAX Z at the address. If MIN Z≦Z≦MAX Z, 'lighting' is performed and thus the luminance calculation processing device 41 is caused to calculate a luminance value for a region being specially lit, in S16.

Then, the address of the frame memory 5 for the dot is determined, the color value of the thus-calculated luminance value is written in the frame memory 5 at the address, and the Z value of the dot is written in the Z-buffer memory 4a at the address, in S17.

However, if it is determined that the Z value of the Z-buffer memory at the address is smaller in S12, it is determined that the dot should be hidden. Then, S18 is immediately performed. Further, if it is determined in S14 that there is no light polygon at the address, S17 is immediately performed. Then, the address of the frame memory 5 for the dot is determined, a color value of an ordinary (not specially lit) luminance value of the dot is written in the frame memory 5 at the address, and the Z value of the dot is written in the Z-buffer memory 4a at the address, in S17. Further, if it is determined in S15 that the condition MIN Z≦Z≦MAX Z is not satisfied, it is determined that the dot is not a dot contained in the light object. Then, S17 is immediately performed. Then, the address of the frame memory 5 for the dot is determined, the color value of the ordinary luminance value of the dot is written in the frame memory 5 at the address, and the Z value of the dot is written in the Z-buffer memory 4a at the address, in S17.

Then, in S18, it is determined whether or not all the dots present in the polygon have been processed. If not all the dots have been processed, the operation returns to S11, and the above-described operation is repeated for processing the remaining dots until all the dots of the polygons have been processed. When all the dots have been processed, the current operation has been terminated.

Figure 19:
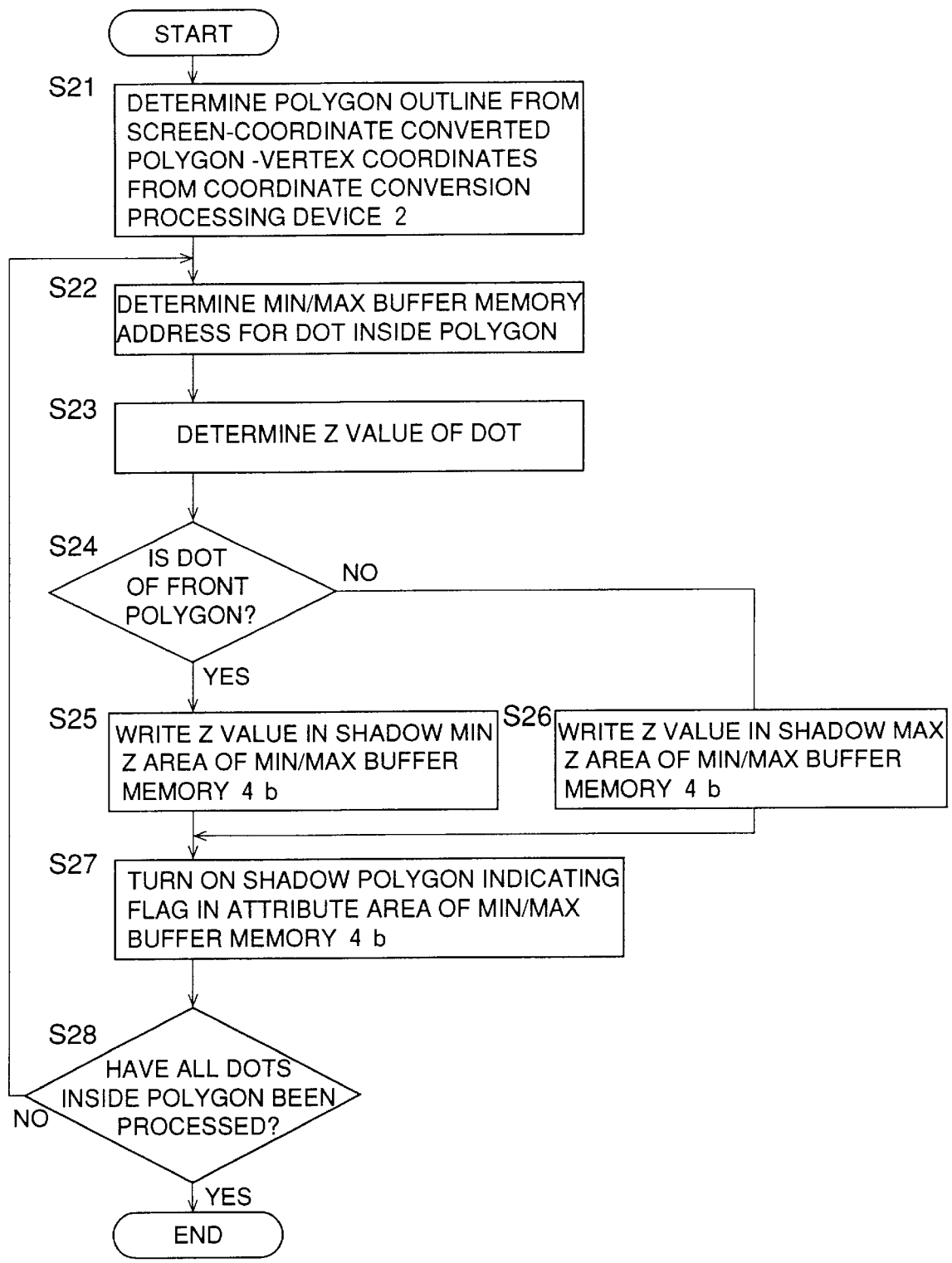
FIG. 19 shows an operation flowchart performed by the drawing processing device shown in FIG. 14 in a case where 'shadowing' is performed and a polygon being processed is a shadow polygon.
Figure 20:
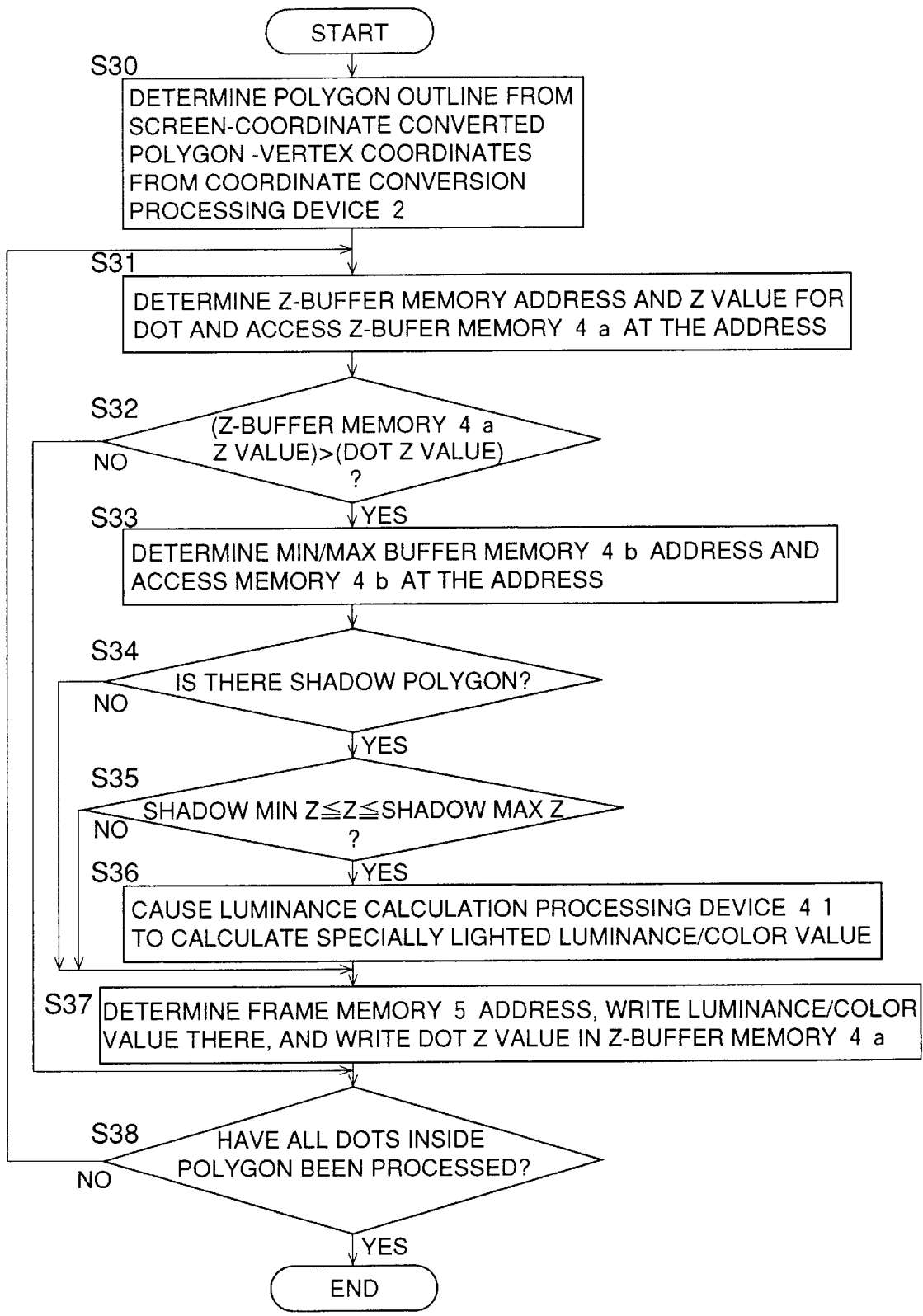
FIG. 20 shows an operation flowchart performed by the drawing processing device in a case where 'shadowing' is performed and a polygon being processed is an ordinary polygon.

FIGS. 19 and 20 show operation flowcharts when 'shadowing' is performed. FIG. 19 illustrates an operation when a polygon being processed is a polygon of a 'shadow object' (such a polygon being referred to as a shadow polygon, hereinafter) and FIG. 20 illustrates an operation when a polygon being processed is a polygon of an ordinary polygon (other than the shadow polygon).

With reference to FIG. 19, the operation of shadow polygon processing will now be described.

An outline of a light polygon is determined in a step S21 by using coordinates of polygon vertices, which coordinates have been obtained as a result of coordinate conversion into the screen coordinate system in the coordinate conversion processing device 2. Then, in S22, an address of the MIN/MAX buffer memory 4b is calculated for each dot present in the polygon. In S23, the Z value of the dot is determined.

Then, in S24, it is determined whether the polygon is a front polygon or a rear polygon of the shadow object such as that mentioned above. When the polygon is a front polygon, the Z value is written in the SHADOW MIN Z area at the address of the MIN/MAX buffer memory 4b in S25. When the polygon is a rear polygon, the Z value is written in the SHADOW MAX Z area at the address of the MIN/MAX buffer memory 4b in S26.

Further, in S27, a flag for indicating a presence of the shadow polygon in the attribute area at the address of the MIN/MAX buffer memory 4b is turned ON. Then, in S28, it is determined whether or not all the dots present in the polygon have been processed. If not all the dots have been processed, the operation returns to S22, and the above-described operation is repeated for processing the remaining dots until all the dots of the polygons have been processed. When all the dots have been processed, the current operation is terminated.

With reference to FIG. 20, the operation of ordinary polygon processing will now be described.

An outline of a shadow polygon is determined in a step S30 by using coordinates of polygon vertices, which coordinates have been obtained as a result of coordinate conversion into the screen coordinate system in the coordinate conversion processing device 2. Then, in S31, an address of the Z-buffer memory 4a is calculated for each dot present in the polygon, the Z value of the dot is determined, and the Z-buffer memory 4a is accessed at the address.

Then, in S32, the Z value of the Z-buffer memory 4a at the address is compared with the Z value of the dot determined in S31, and it is determined which Z value is larger. When the Z value in the Z-buffer memory 4a is larger, the address of the MIN/MAX buffer memory 4b for the dot is determined and the MIN/MAX buffer memory 4b is accessed at the address, in S33. Then, in S34, it is determined whether or not the flag of the attribute area at the address of the MIN/MAX buffer memory 4b is in an ON state, and thus there is a shadow polygon including the address. When there is a shadow polygon including the address, it is determined in S35 whether MIN Z≦Z≦MAX Z, that is, the Z value of the dot is a value between the SHADOW MIN Z and SHADOW MAX Z at the address. If MIN Z≦Z≦MAX Z, the 'shadowing' is performed and thus the luminance calculation processing device 41 is caused to calculate a shadow luminance value, in S36.

Then, the address of the frame memory 5 for the dot is determined, the color value of the thus-calculated luminance value is written in the frame memory 5 at the address, and the Z value of the dot is written in the Z-buffer memory 4*a* at the address, in S37.

However, if it is determined that the Z value of the Z-buffer memory at the address is smaller in S32, it is determined that the dot should be hidden. Then, S38 is immediately performed. Further, if it is determined in S34 that there is no shadow polygon at the address, S37 is immediately performed. Then, the address of the frame memory 5 for the dot is determined, the color value of an ordinary (non-shadow) luminance value is written in the frame memory 5 at the address, and the Z value of the dot is written in the Z-buffer memory 4*a* at the address, in S37. Further, if it is determined in S35 that the condition MIN $Z \leq Z \leq MAX\ Z$ is not satisfied, it is determined that the dot is not a dot contained in the shadow object. Then, S37 is immediately performed. Then, the address of the frame memory 5 for the dot is determined, the color value of the ordinary luminance value of the dot is written in the frame memory 5 at the address, and the Z value of the dot is written in the Z-buffer memory 4*a* at the address, in S37.

Then, in S38, it is determined whether or not all the dots present in the polygon have been processed. If all the dots have not been processed, the operation returns to S31, and the above-described operation is repeated for processing the remaining dots until all the dots of the polygons have been processed. When all the dots have been processed, the current operation is terminated.

Figure 21:
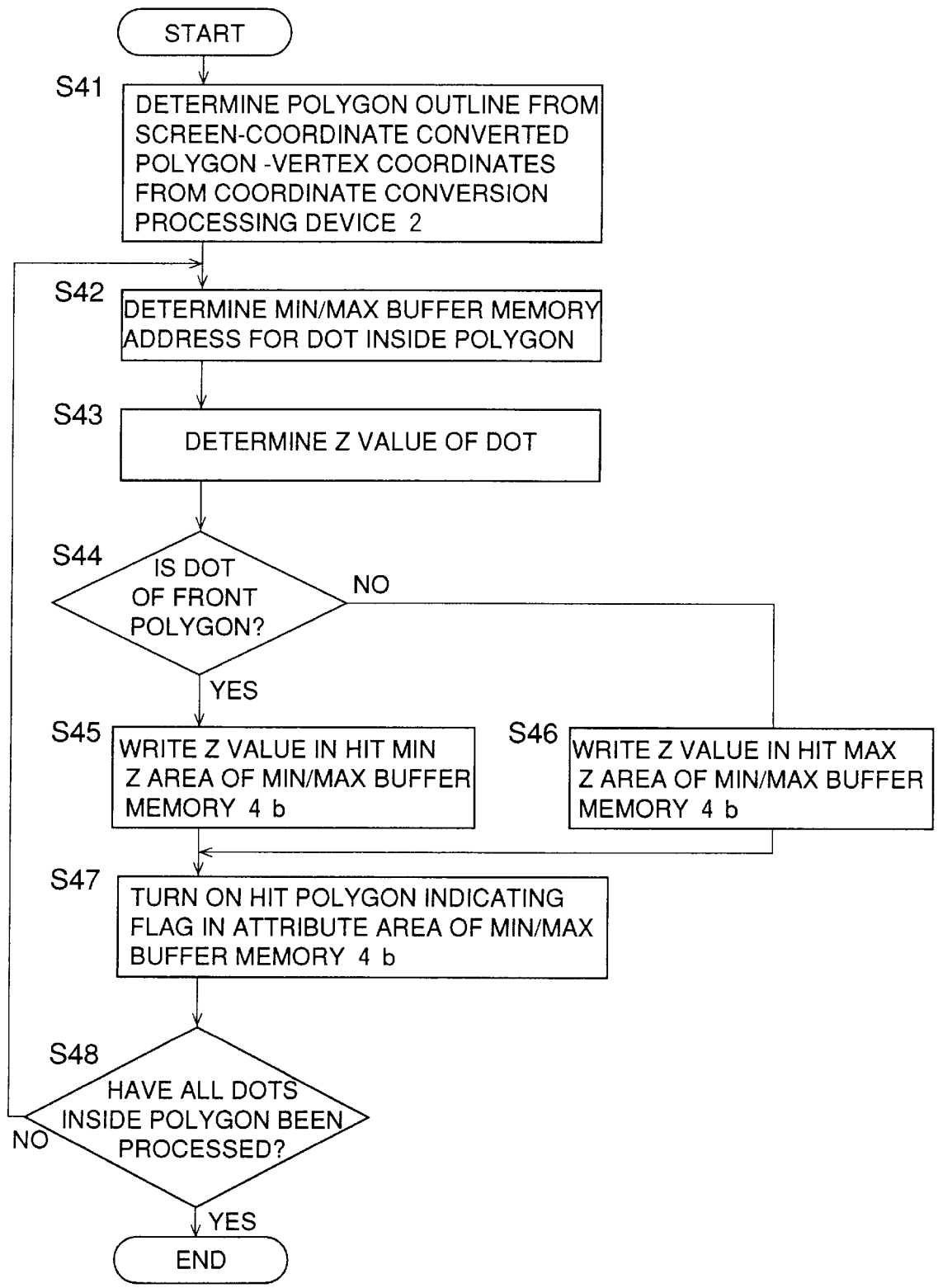
FIG. 21 shows an operation flowchart performed by the drawing processing device shown in FIG. 14 in a case where 'hit determination' is performed and a polygon being processed is a hit polygon.
Figure 22:
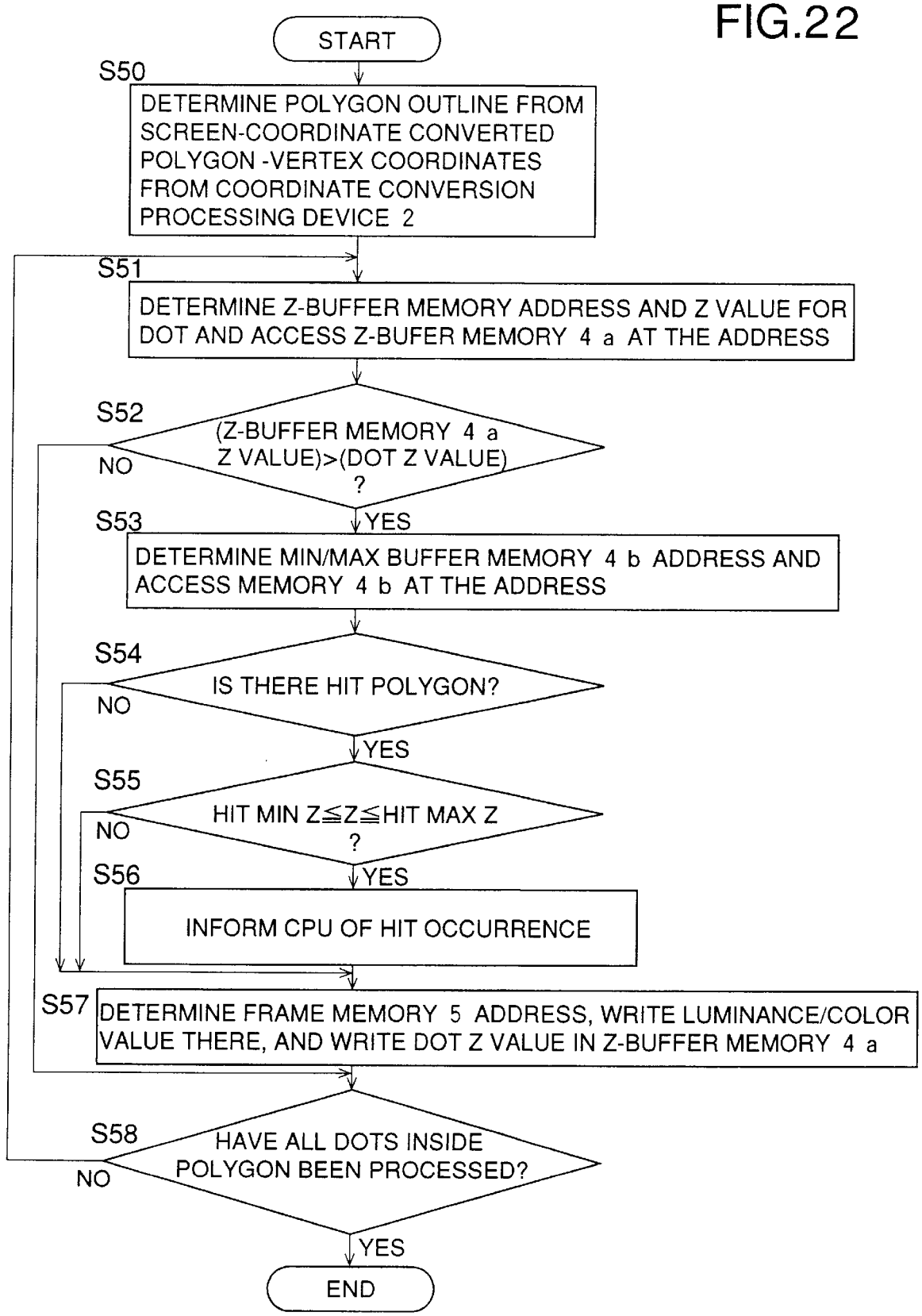
FIG. 22 shows an operation flowchart performed by the drawing processing device in a case where 'hit determination' is performed and a polygon being processed is an ordinary polygon.

FIGS. 21 and 22 show operation flowcharts when 'hit determination' is performed. FIG. 21 illustrates an operation when a polygon being processed is a polygon of a 'hit object' (such a polygon being referred to as a hit polygon, hereinafter) and FIG. 22 illustrates an operation when a polygon being processed is an ordinary polygon (other than the hit polygon).

With reference to FIG. 21, the operation of hit polygon processing will now be described.

An outline of a light polygon is determined in a step S41 by using coordinates of polygon vertices, which coordinates have been obtained as a result of coordinate conversion into the screen coordinate system in the coordinate conversion processing device 2. Then, in S42, an address of the MIN/MAX buffer memory 4*b* is calculated for each dot present in the polygon. In S43, the Z value of the dot is determined.

Then, in S44, it is determined whether the polygon is a front polygon or a rear polygon of the hit object such as that mentioned above. When the polygon is a front polygon, the Z value is written in the HIT MIN Z area at the address of the MIN/MAX buffer memory 4*b* in S45. When the polygon is a rear polygon, the Z value is written in the HIT MAX Z area at the address of the MIN/MAX buffer memory 4*b* in S46.

Further, in S47, a flag for indicating a presence of the hit polygon in the attribute area at the address of the MIN/MAX buffer memory 4*b* is turned ON. Then, in S48, it is determined whether or not all the dots present in the polygon have been processed. If all the dots have not been processed, the operation returns to S42, and the above-described operation is repeated for processing the remaining dots until all the dots of the polygons have been processed. When all the dots have been processed, the current operation is terminated.

With reference to FIG. 22, the operation of ordinary polygon processing will now be described.

An outline of a hit polygon is determined in a step S50 by using coordinates of polygon vertices, which coordinates have been obtained as a result of coordinate conversion into the screen coordinate system in the coordinate conversion processing device 2. Then, in S51, an address of the Z-buffer memory 4*a* is calculated for each dot present in the polygon, the Z value of the dot is determined, and the Z-buffer memory 4*a* is accessed at the address.

Then, in S52, the Z value of the Z-buffer memory 4*a* at the address is compared with the Z value of the dot determined in S51, and it is determined which Z value is larger. When the Z value in the Z-buffer memory 4*a* is larger, the address of the MIN/MAX buffer memory 4*b* for the dot is determined and the MIN/MAX buffer memory 4*b* is accessed at the address, in S53. Then, in S54, it is determined whether or not the flag of the attribute area at the address of the MIN/MAX buffer memory 4*b* is in an ON state, and thus there is a hit polygon including the address. When there is a hit polygon including the address, it is determined in S55 whether MIN $Z \leq Z \leq MAX\ Z$, that is, the Z value of the dot is a value between the HIT MIN Z and HIT MAX Z at the address. If MIN $Z \leq Z \leq MAX\ Z$, it is determined that 'hit' occurs, and this information is provided to the CPU, in S56.

Then, the address of the frame memory 5 for the dot is determined, a color value of an ordinary luminance value is written in the frame memory 5 at the address, and the Z value of the dot is written in the Z-buffer memory 4*a* at the address, in S57.

However, if it is determined that the Z value of the Z-buffer memory at the address is smaller in S52, it is determined that the dot should be hidden. Then, S58 is immediately performed. Further, if it is determined in S54 that there is no hit polygon at the address, S57 is immediately performed. Then, the address of the frame memory 5 for the dot is determined, the color value of the ordinary luminance value is written in the frame memory 5 at the address, and the Z value of the dot is written in the Z-buffer memory 4*a* at the address, in S57. Further, if it is determined in S55 that MIN $Z \leq Z \leq MAX\ Z$ is not satisfied, it is determined that the dot is not a dot contained in the hit object. Then, S57 is immediately performed. Then, the address of the frame memory 5 for the dot is determined, the color value of the ordinary luminance value is written in the frame memory 5 at the address, and the Z value of the dot is written in the Z-buffer memory 4*a* at the address, in S57.

Then, in S58, it is determined whether or not all the dots present in the polygon have been processed. If all the dots have not been processed, the operation returns to S51, and the above-described operation is repeated for processing the remaining dots until all the dots of the polygons have been processed. When all the dots have been processed, the current operation is terminated.

It is also possible that, using common hardware, 'lighting', 'shadowing' and 'hit determination' are performed at the same time. In such a case, a priority order is predetermined among the 'lighting', 'shadowing' and 'hit determination' and thus it is determined that each dot has, as an identification code, only one attribute of 'ordinary polygon', 'light polygon', 'shadow polygon' and 'hit polygon'. Thereby, it is also possible that, using common hardware, 'lighting', 'shadowing' and 'hit determination' are performed at the same time.

Further, in the embodiment, the Z-buffer memory 4*a*, MIN/MAX buffer memory 4*b* and frame memory 5 are individual memories. However, it is also possible to form the Z-buffer memory 4*a*, MIN/MAX buffer memory 4*b* and frame memory 5 in individual regions of a single memory.

Further, the present invention is not limited to the above-described embodiments, and variations and modifications may be made without departing from the scope of the present invention.

What is claimed is:

1. A three-dimensional graphics processing apparatus, comprising:

first storing means for storing objects including an ordinary object and a special object, each object comprising polygons;

coordinate conversion means for placing each object stored in said first storing means in a three-dimensional coordinate system, and converting coordinates of the placed object into coordinates of a screen coordinate system;

second storing means for storing Z values of front polygons of said special object and Z values of rear polygons of said special object to define a predetermined volume, said second storing means having a capacity of storing a frame of data;

determination means for determining whether Z values of a polygon of said ordinary object are values within the predetermined volume, by determining whether said Z values of the polygon of said ordinary object are values between said Z values of said front polygons and said Z values of said rear polygons of said special object stored in said second storing means; and performance means for performing a predetermined special operation when said determination means determines that said Z values of said polygon of said ordinary object are values between said Z values of said front polygons and said Z values of said rear polygons of said special object.

2. The three-dimensional graphics processing apparatus according to claim 1, wherein:

said special object comprises a shadow object; and said predetermined special operation comprises shadowing for performing a predetermined shadow luminance calculation.

3. The three-dimensional graphics processing apparatus according to claim 1, wherein:

said special object comprises a light object; and said predetermined special operation comprises lighting for performing a predetermined light luminance calculation.

4. The three-dimensional graphics processing apparatus according to claim 1, wherein:

said special object comprises a hit object; and said predetermined special operation comprises a hit occurrence determination for performing a predetermined hit occurrence operation.

5. The three-dimensional graphics processing apparatus according to claim 1, further comprising:

Z-buffer memory means; and hidden surface processing means for comparing Z values of said polygon of said ordinary object with Z values stored in said Z-buffer memory and performing a predetermined hidden surface processing.

* * * * *